(12) United States Patent
Brugler et al.

(10) Patent No.: US 8,918,405 B2
(45) Date of Patent: Dec. 23, 2014

(54) AUTO SUGGESTION TOOL

(71) Applicant: International Business Machines Corporation, Armonk, NY (US)

(72) Inventors: Thomas Stanton Brugler, Research Triangle Park, NC (US); Vincent Charles Conzola, Research Triangle Park, NC (US); Randall Avery Craig, Research Triangle Park, NC (US); John Paul Franks, Research Triangle Park, NC (US); Mark E. Molander, Research Triangle Park, NC (US)

(73) Assignee: International Business Machines Corporation, Armonk, NY (US)

( * ) Notice: Subject to any disclaimer, the term of this patent is extended or adjusted under 35 U.S.C. 154(b) by 121 days.

(21) Appl. No.: 13/689,526

(22) Filed: Nov. 29, 2012

(65) Prior Publication Data

US 2014/0149426 A1    May 29, 2014

(51) Int. Cl.
*G06F 17/30* (2006.01)
(52) U.S. Cl.
CPC ............................. *G06F 17/30386* (2013.01)
USPC ....................................................... 707/748
(58) Field of Classification Search
CPC .......... G06F 17/3053; G06F 17/30598; G06F 17/30716; G06F 17/30259
USPC ....................................................... 707/748
See application file for complete search history.

(56) References Cited

U.S. PATENT DOCUMENTS

| 2007/0033184 | A1* | 2/2007 | Friedman | 707/6 |
| 2008/0215583 | A1* | 9/2008 | Gunawardena et al. | 707/7 |
| 2008/0313565 | A1 | 12/2008 | Albertson | |
| 2009/0079742 | A1* | 3/2009 | Albertson et al. | 345/441 |
| 2011/0125760 | A1* | 5/2011 | Frieden et al. | 707/748 |
| 2011/0202887 | A1 | 8/2011 | Mendez | |
| 2013/0268889 | A1* | 10/2013 | Barak et al. | 715/825 |

OTHER PUBLICATIONS

Liu Wenyin, et al., "Sketch-Based User Interface for Inputting Graphic Objects on Small Screen Devices", Lecture Notes in Computer Science vol. 2390, Springer-Verlag, Jun. 2003, pp. 67-80.

* cited by examiner

*Primary Examiner* — Rehana Perveen
*Assistant Examiner* — Alexander Khong
(74) *Attorney, Agent, or Firm* — Derek S. Jennings; Patent Mining Works, LLC

(57) ABSTRACT

A method includes populating an auto suggestion field with objects of the same type based upon the type of object selected in the main area of the application. The auto suggestion field is set to have N levels. The method further includes placing a recently used object in a first position of the N levels of the auto suggestion field. Succeeding objects are placed in other positions of the N levels in the auto suggestion field, wherein the succeeding objects are ordered based upon recency and frequency of use and the populating is executed by at least one processor.

8 Claims, 22 Drawing Sheets

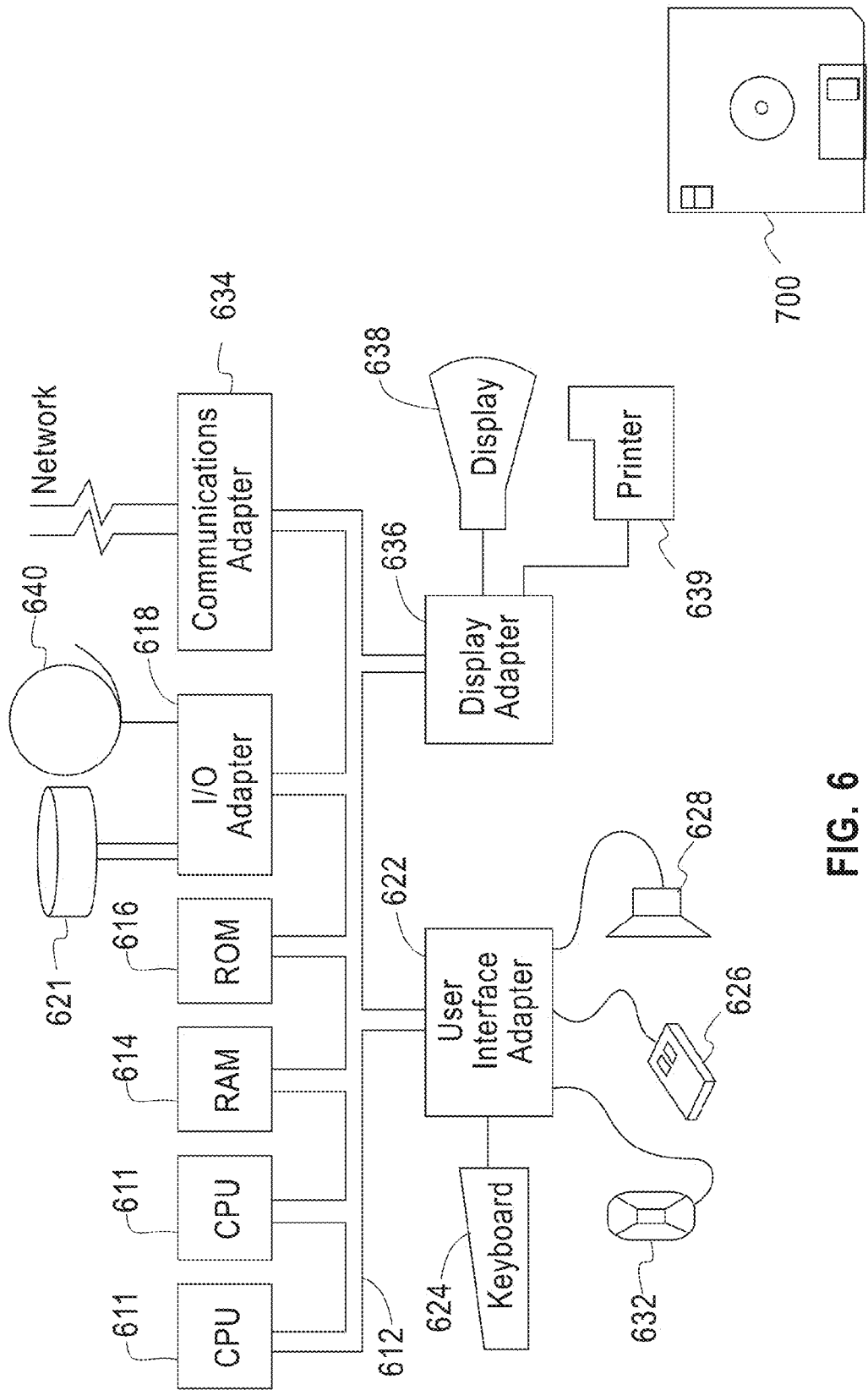

AUTO SUGGESTION TOOL

BACKGROUND

The present invention relates to populating an auto suggestion field with objects, and more specifically, to using ranking values for the populated objects.

SUMMARY

According to one aspect of the present invention, a method includes: populating an auxiliary auto suggestion area with objects of the same type based upon the type of object that the user has selected in the main area of the application, setting a N level for the auto suggestion field, placing a recently used object in a first position of the N level of the auto suggestion field, and placing succeeding objects in other positions of the N level in the auto suggestion field, wherein the succeeding objects are ordered based upon recency and frequency of use and the populating is executed by at least one processor.

According to another aspect of the present invention, a system includes: an auto suggestion field configured to be populated with objects of the same type and same context, the auto suggestion field is provided with N levels for placing the objects, wherein a recently used object is placed in a first position of the N levels in the auto suggestion field and succeeding objects are placed in other positions of the N levels in the auto suggestion field based upon a ranking order and the population of the auto suggestion field is executed by at least one processor.

According to still aspect of the present invention, a computer program product includes a computer readable storage medium having program code stored thereon, wherein the program code when executed on a computer causes the computer to: populate an auto suggestion field with objects of the same type and same context, set a N level for the auto suggestion field, place a recently used object in a first position of the N level of the auto suggestion field, and place succeeding objects in other positions of the N level in the auto suggestion field, wherein the succeeding objects are placed based upon a ranking order.

BRIEF DESCRIPTION OF THE SEVERAL VIEWS OF THE DRAWINGS

FIG. 6 illustrates a hardware configuration according to an embodiment of the present invention.

FIG. 7 shows a storage medium according to an embodiment of the present invention.

DETAILED DESCRIPTION

Figure 1:
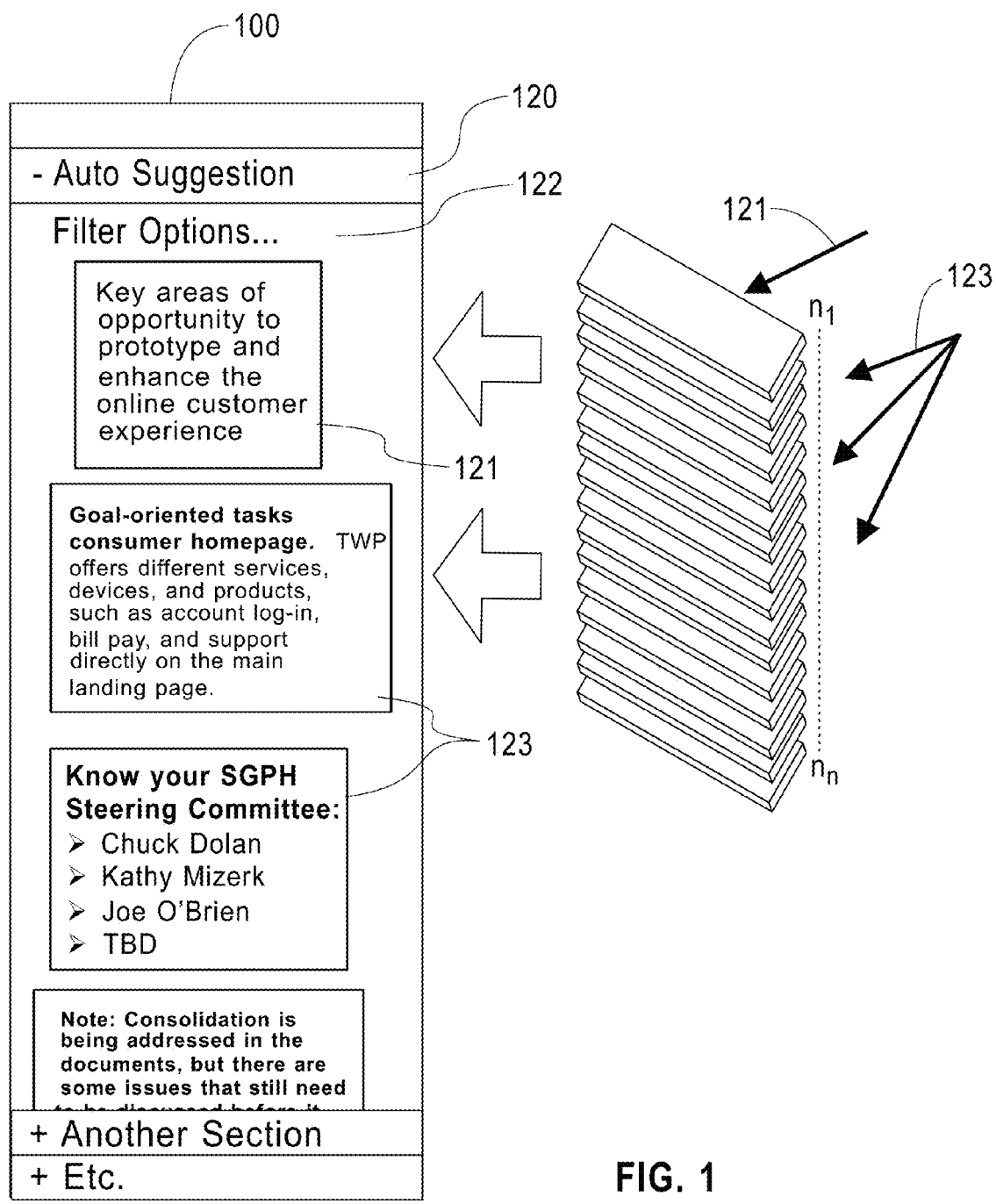
FIG. 1 illustrates an auto suggestion field according to an embodiment of the present invention.

Before explaining at least one embodiment of the invention in detail, it is to be understood that the invention is not limited in its application to the details of construction and the arrangement of the components set forth in the following description or illustrated in the drawings. The invention is applicable to other embodiments or of being practiced or carried out in various ways. Also, it is to be understood that the phraseology and terminology employed herein is for the purpose of description and should not be regarded as limiting. As will be appreciated by one skilled in the art, aspects of the present invention may be embodied as a system, method or computer program product.

With reference now to FIG. 1, a sidebar 100 that may be part of a graphical drawing program, a search program, or some other user interface, includes an auto suggestion field 120. The auto suggestion field 120 is populated with objects according to a ranking order and are placed in a N position according to an algorithm. The ranking order is based upon recent use and frequency. Top object 121 would be the most recently used version of this object and is placed in a $n_1$ position. Succeeding objects 123 are positioned based on a ranking from highest to lowest according to its value using the following:

$$(N-PZ)+CF$$

Where:
N=Maximum number of objects displayed in the auto-suggestion list (e.g., an application may use "50" as the N. This means that no more than 50 objects are displayed in the list.);
PZ=Previous z-order ranking of the object the last time a listing of these types of objects were displayed;
CF=Cumulative frequency value. This value increments by one each time the object is used.

It should be noted only one type of object with unique style settings will be shown in the list of auto-suggested objects. If an object gets used, its most recent unique text content will get updated with the object. However when the number of objects in a list exceeds N, any object whose ranking exceeds N will not be displayed and its CF value will be set to zero.

Still referring to FIG. 1, as mentioned above, the objects are placed in $n_1$ through $n_n$ positions according to an embodiment of the present invention. The ability to rank objects is not limited to the above algorithm. In addition, a user has the ability to select a filter options 122 link. The filter options 122 allows for user control of an algorithm. Details regarding the filter options 122 will be described later.

Figure 2:
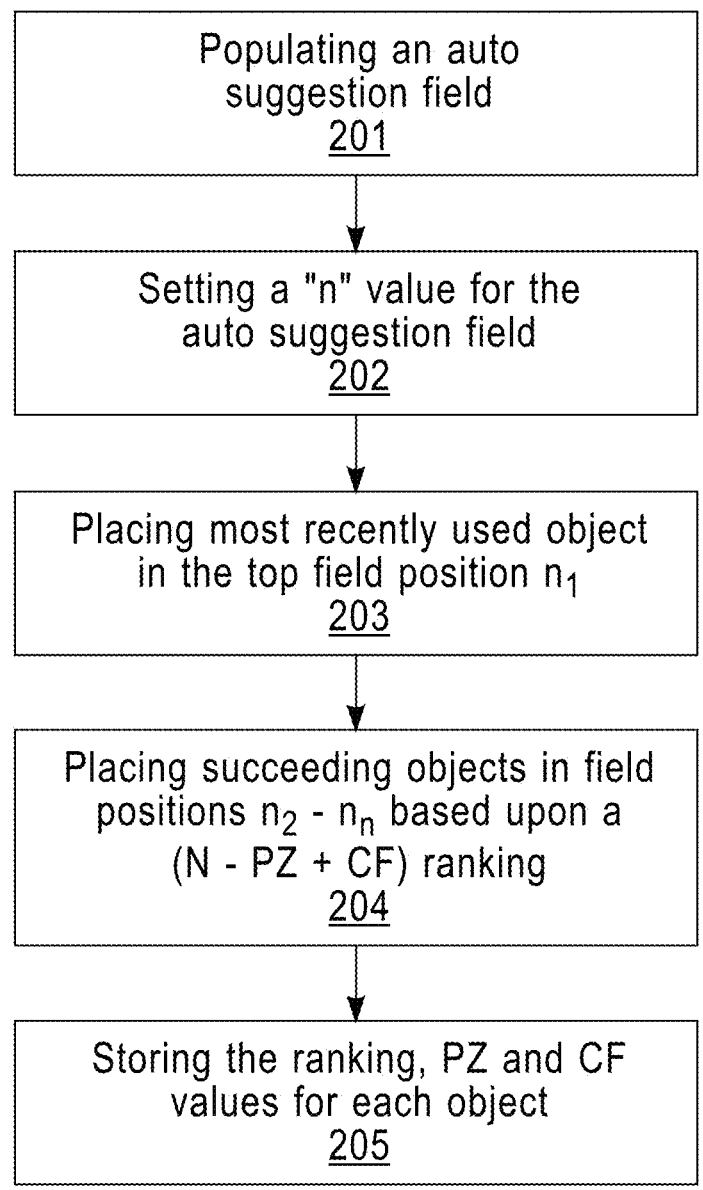
FIG. 2 shows a flow chart according to an embodiment of the present invention.

Referring to FIG. 2, a flow chart according to an embodiment of the invention is depicted. The method includes populating 201 an auto suggestion area by setting 202 a N value for the auto suggestion list. The N value may be user settable or automatic depending on space available. Once the N value is set, a first object is placed 203 at the top of the list in position $n_1$. Succeeding objects are placed 204 in positions $n_2$-$n_n$ based upon a (N−PZ)+CF ranking. Once all of the objects have been placed their ranking, PZ and CF values are stored 205. These values are used the next time the auto suggestion field is populated.

The invention can be understood with reference to a first example. Referring to FIGS. 3A-3J, a graphic drawing application 10 is presented. In this example, the screen represents a typical graphic type drawing program (e.g., Lotus Symphony Presentation, MS PowerPoint, MS Visio, Adobe products, Google documents etc.) The area on the right is showing a generic collapsible section area. The section entitled "Auto Suggestion" field 120 is opened. For the purposes of this example, a user 5 has just started the application and is about to start putting a chart together. The auto suggestion area 120 is currently empty. In the tool palette area 300, the user 5 selects the text box tool 301. Once the text box tool 301 is selected, the auto suggestion field 120 is populated with objects of the same type, see FIG. 3B. The objects vary in style but all are text boxes that a user 5 has previously used. It should be noted that if a particular type of object has never been used, the auto suggestion area 120 may be blank. However, as will be described later, the user 5 could select filter options that allows the auto suggestion field 120 to be populated with objects from other users' files. This may allow the auto suggestion field 120 to be populated regardless of whether the object is being used for the first time.

Figure 3A:
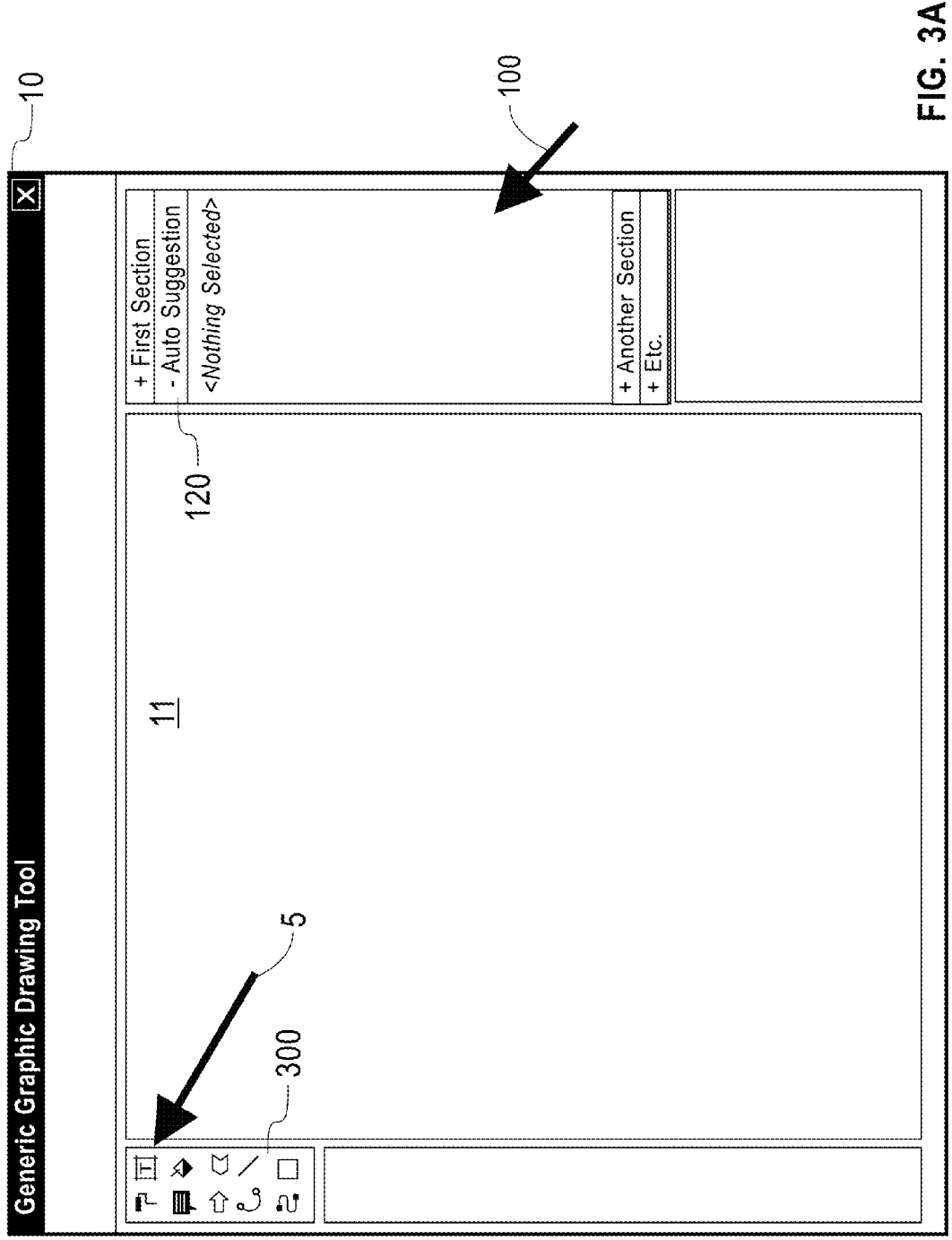
FIGS. 3A-3J illustrate an exemplary implementation according to an embodiment of the present invention.
Figure 3B:
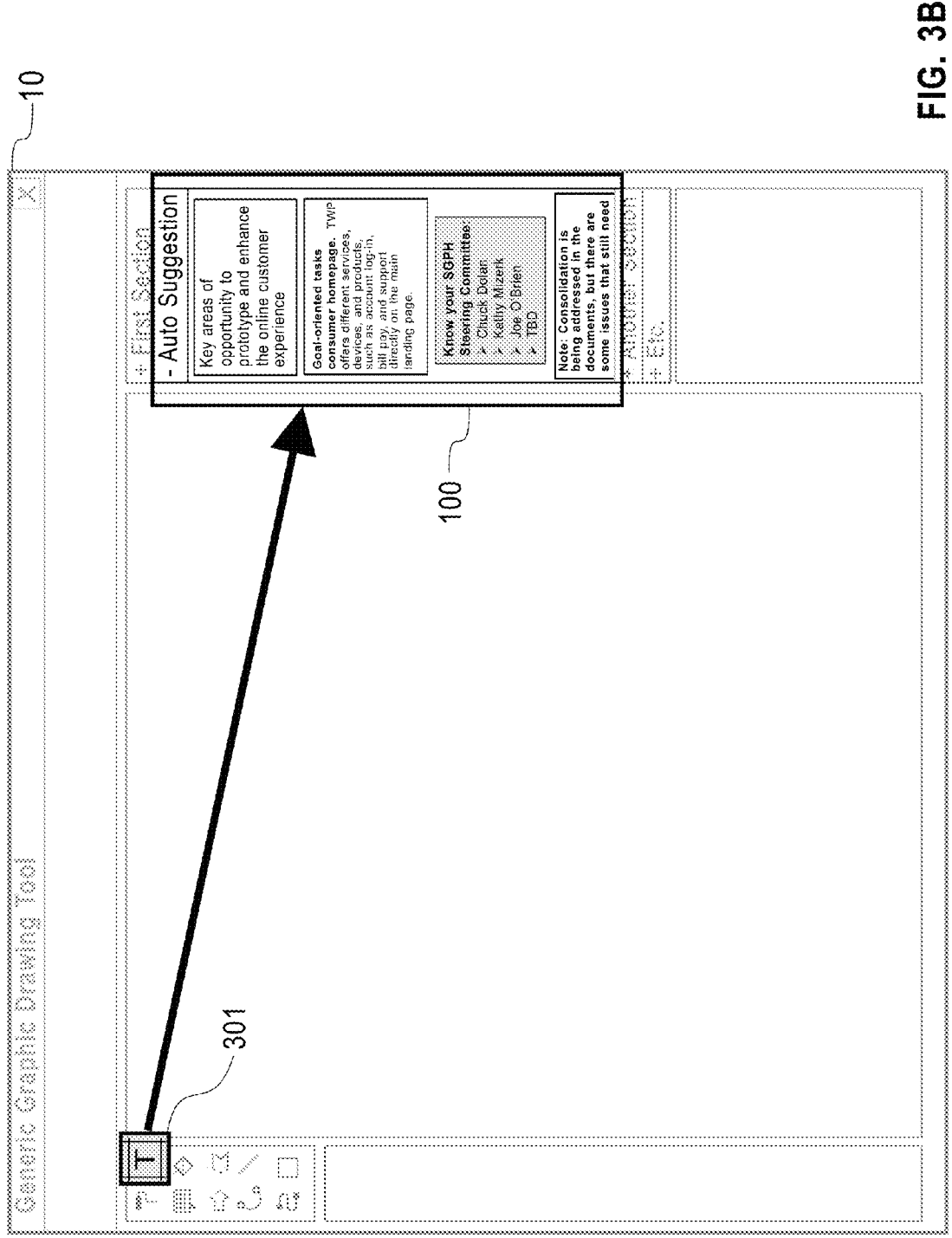
Figure 3C:
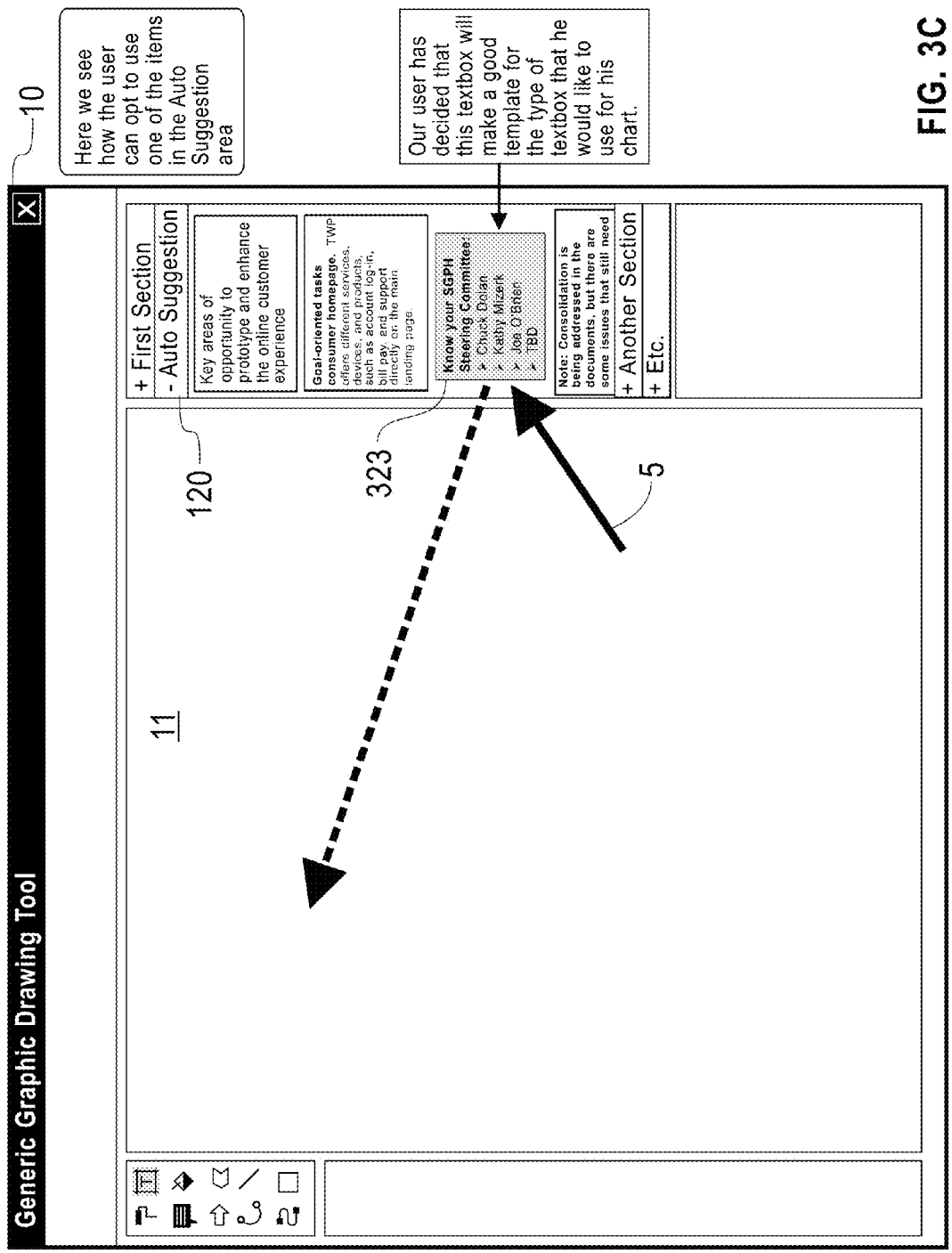
Figure 3D:
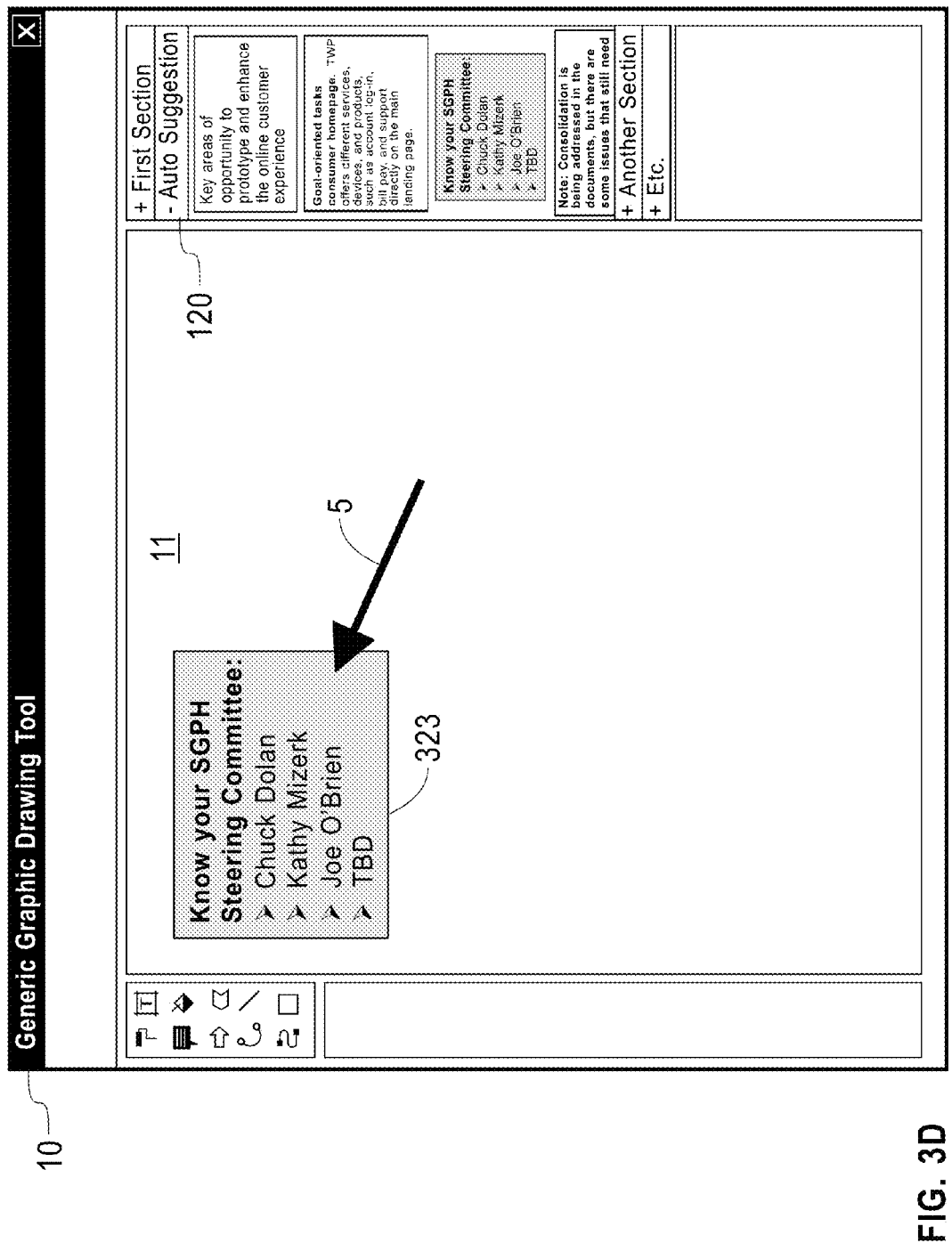
Figure 3E:
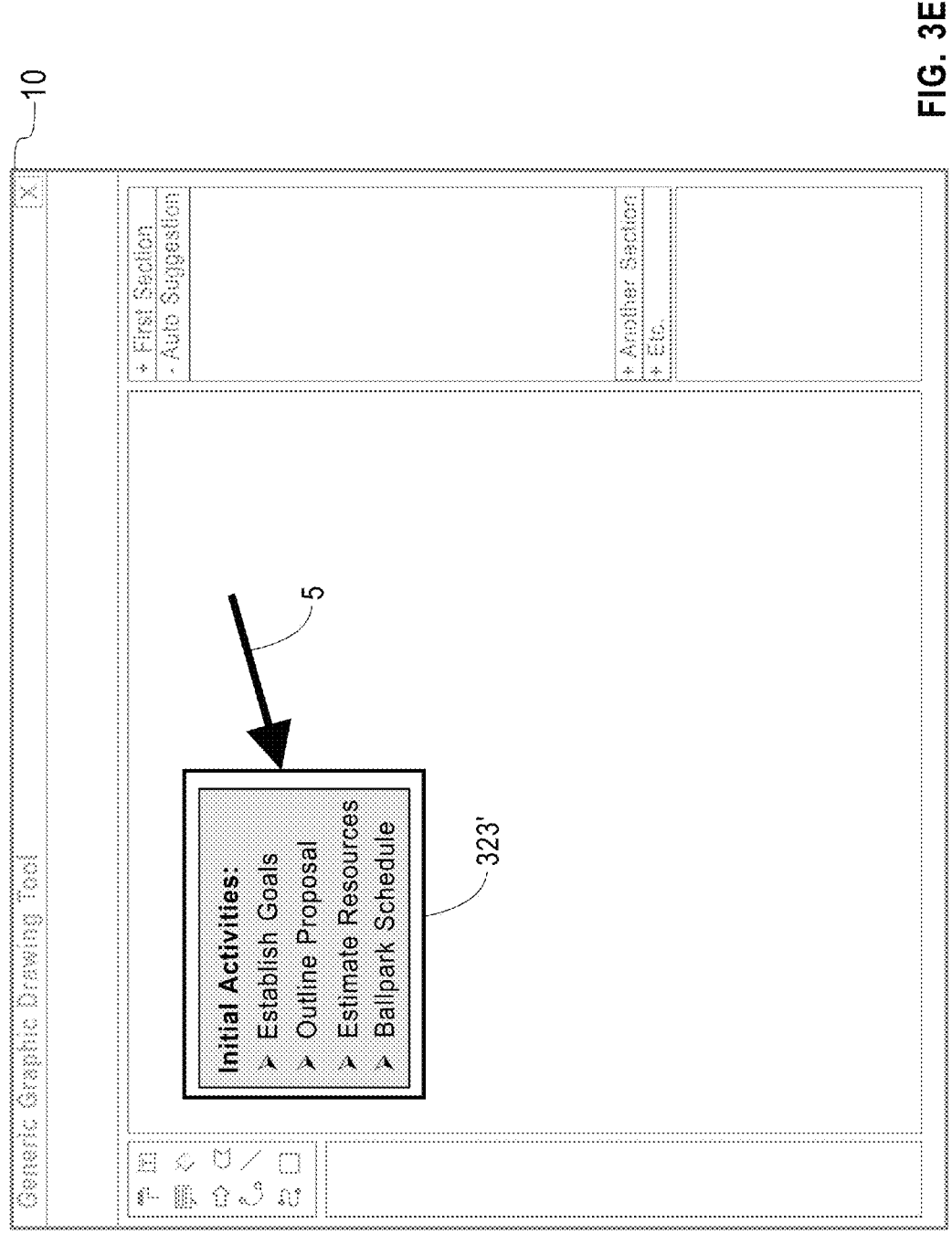
Figure 3F:
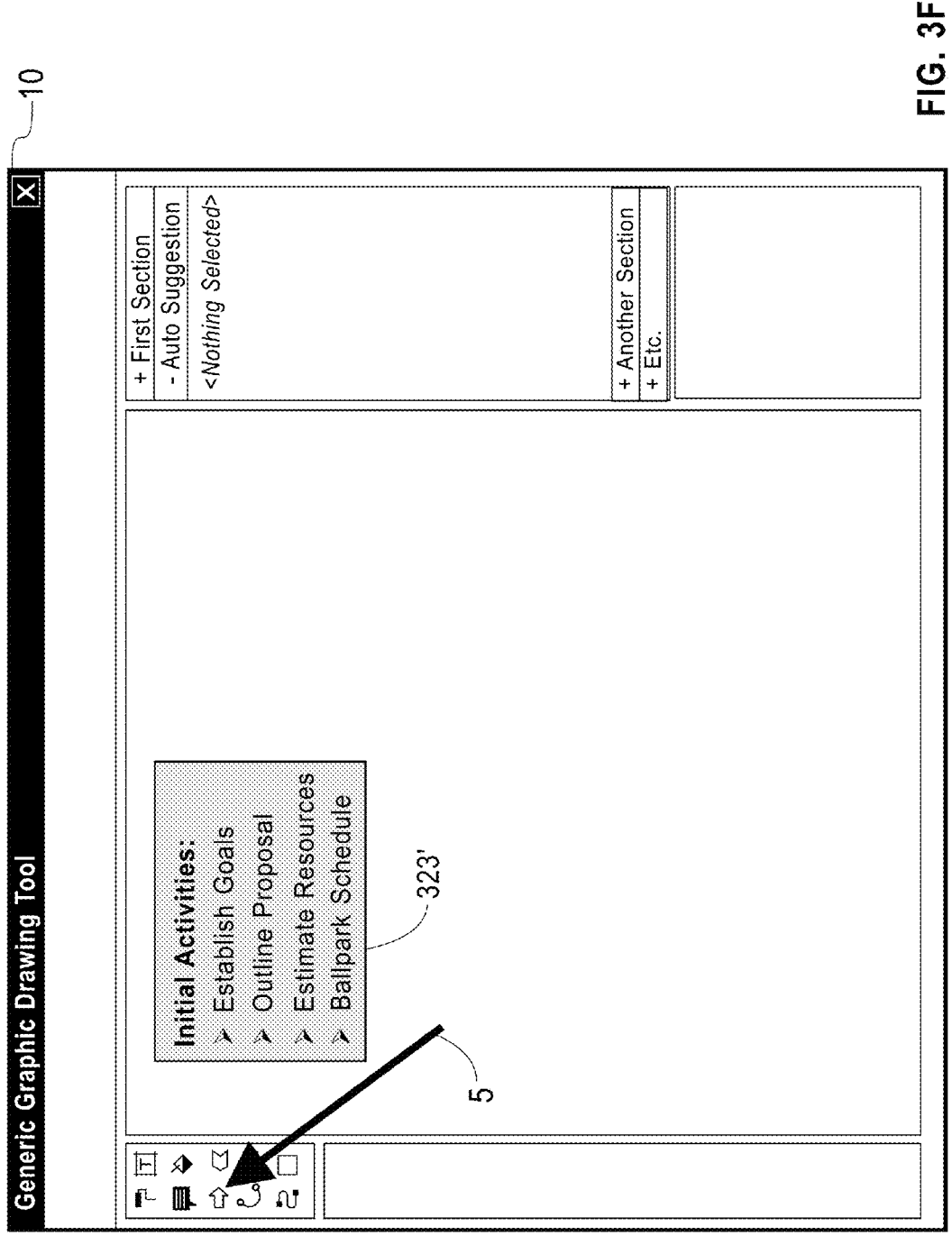
Figure 3G:
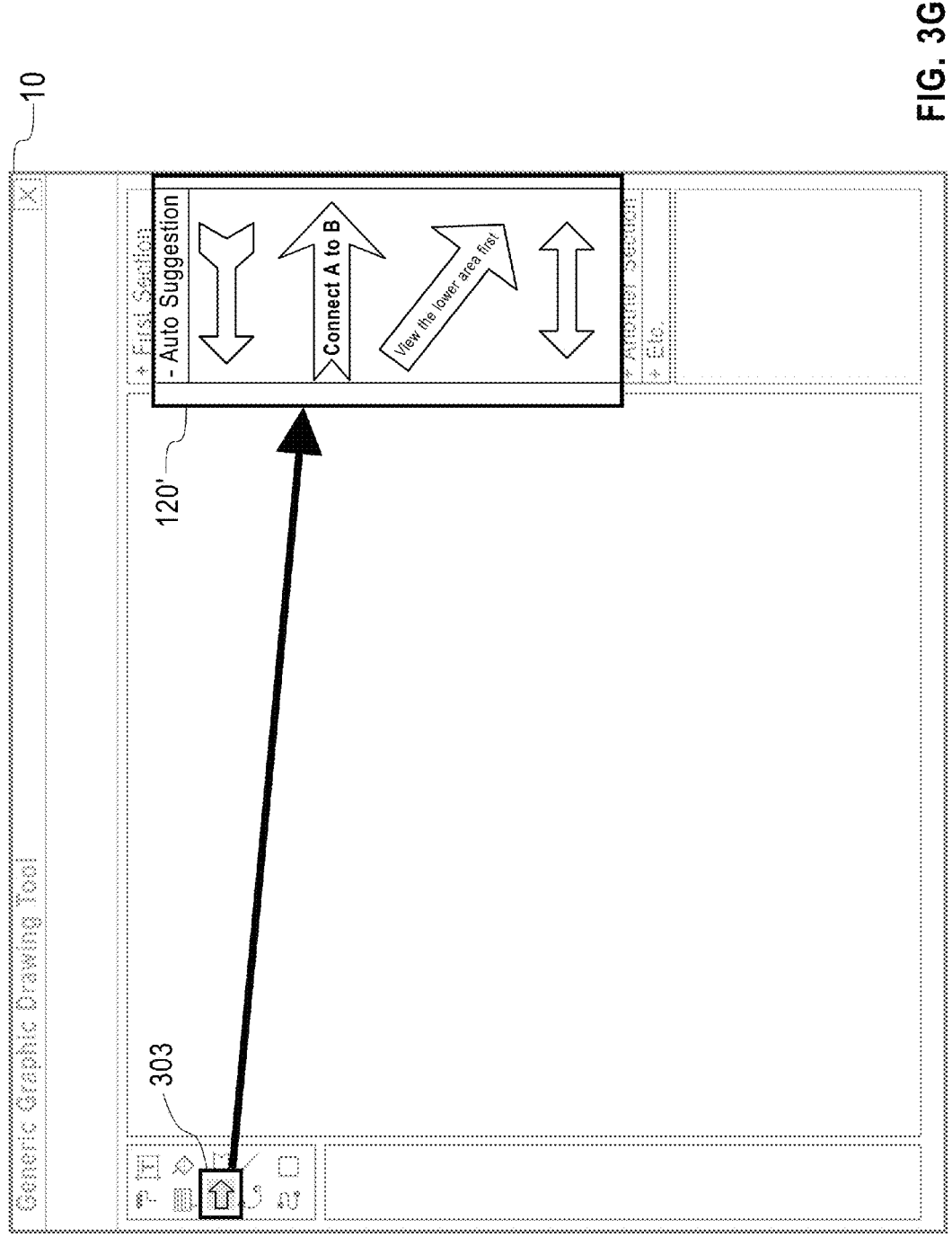

Referring to FIGS. 3C-3E, the user 5 decided to select text object 323 and moves it to work space 11. Once the object 323 is moved to the work space 11, the user 5 may then further modify the text object 323'. By using auto-suggestion, the user has saved time. The user 5 did not have to create a textbox from "scratch". In other words, he did not have to go through the somewhat tedious process of deciding fill color, border line size & color, font-type & size, bullet type etc. Also, the user 5 did not have to "dig-up" previous files looking for text-boxes that the user has used in the past. Instead of either of the above time-consuming activities, the auto-suggestion feature allows the user 5 to view and select from textboxes that he has used before without ever leaving the main window of the application.

Figure 3H:
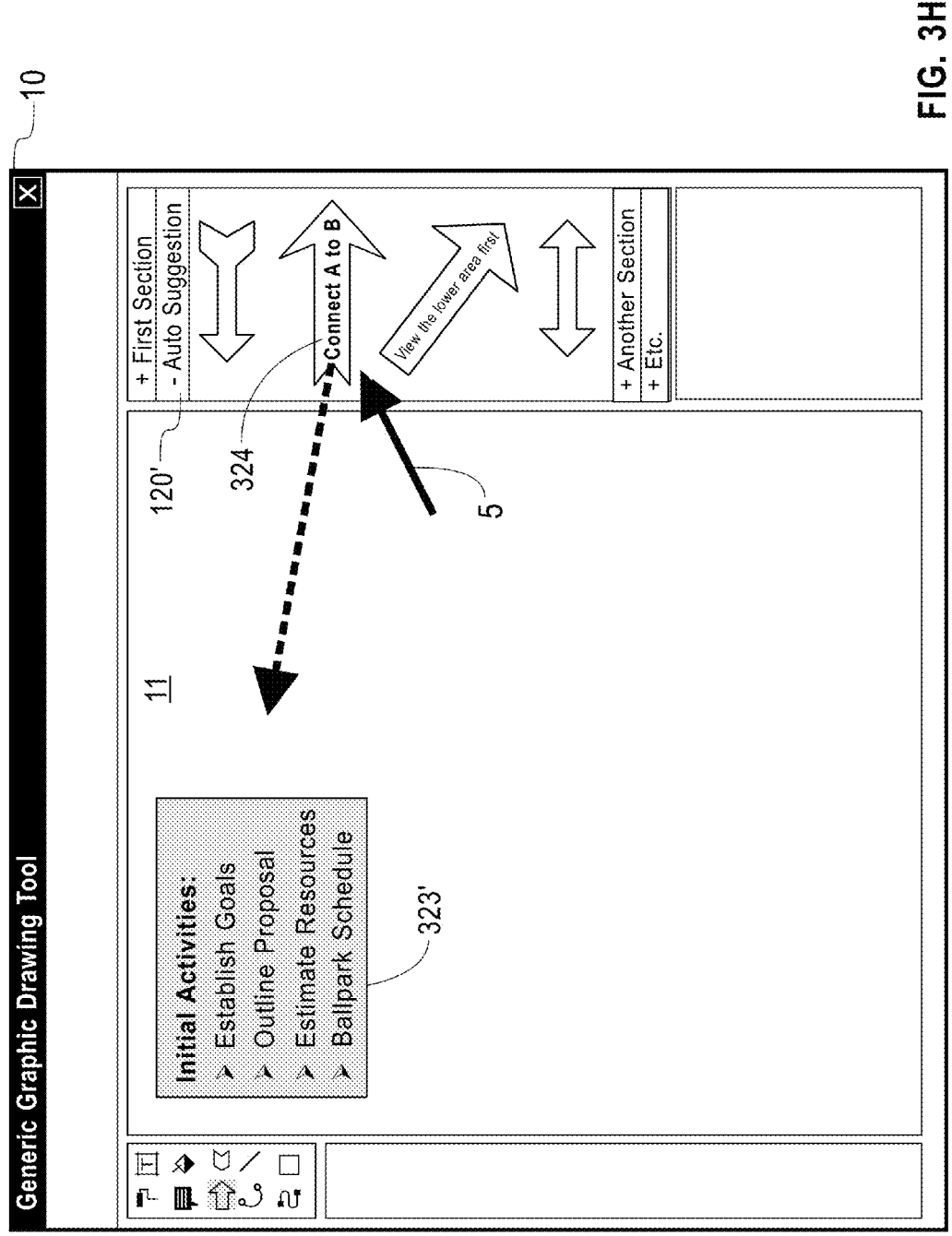
Figure 3I:
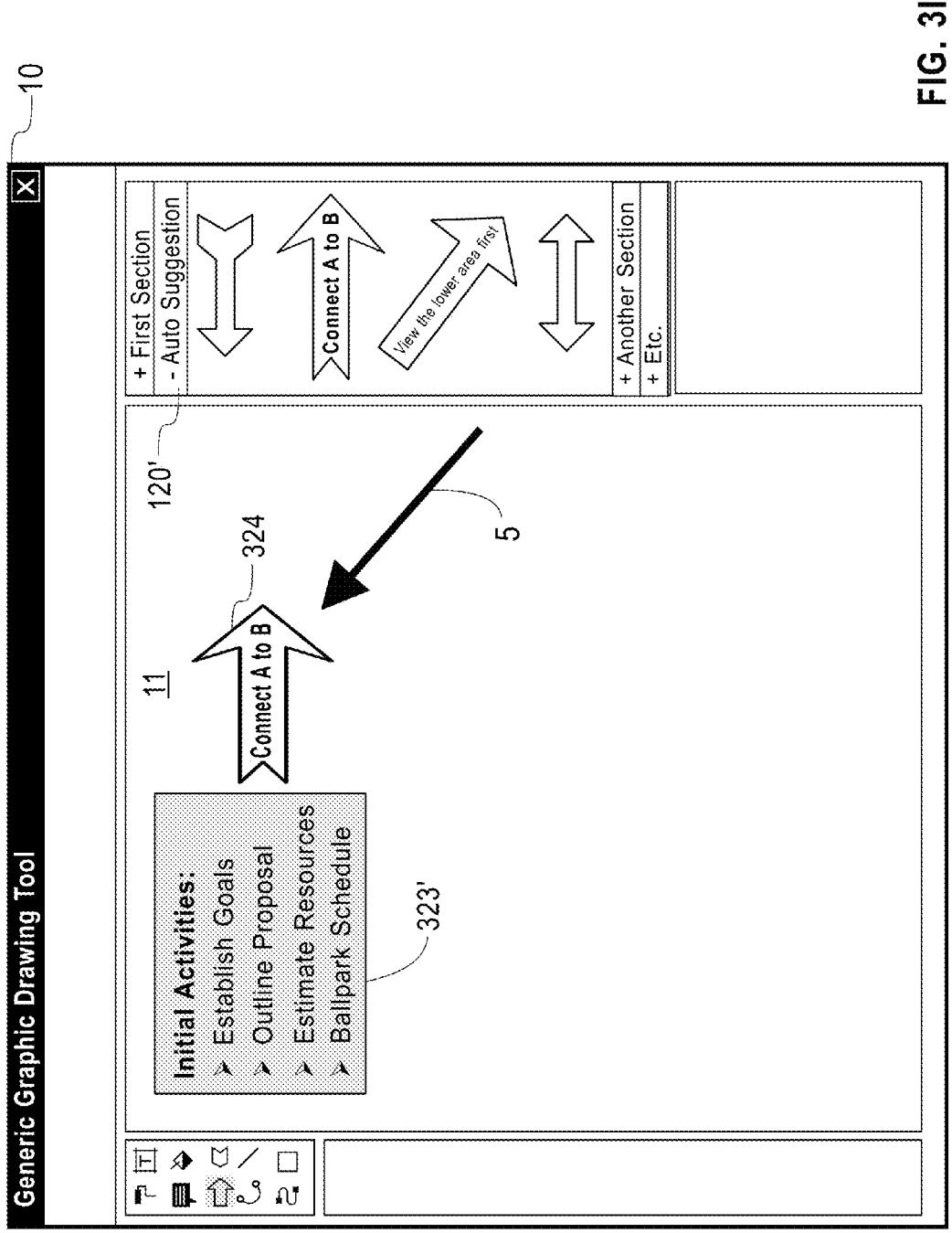
Figure 3J:
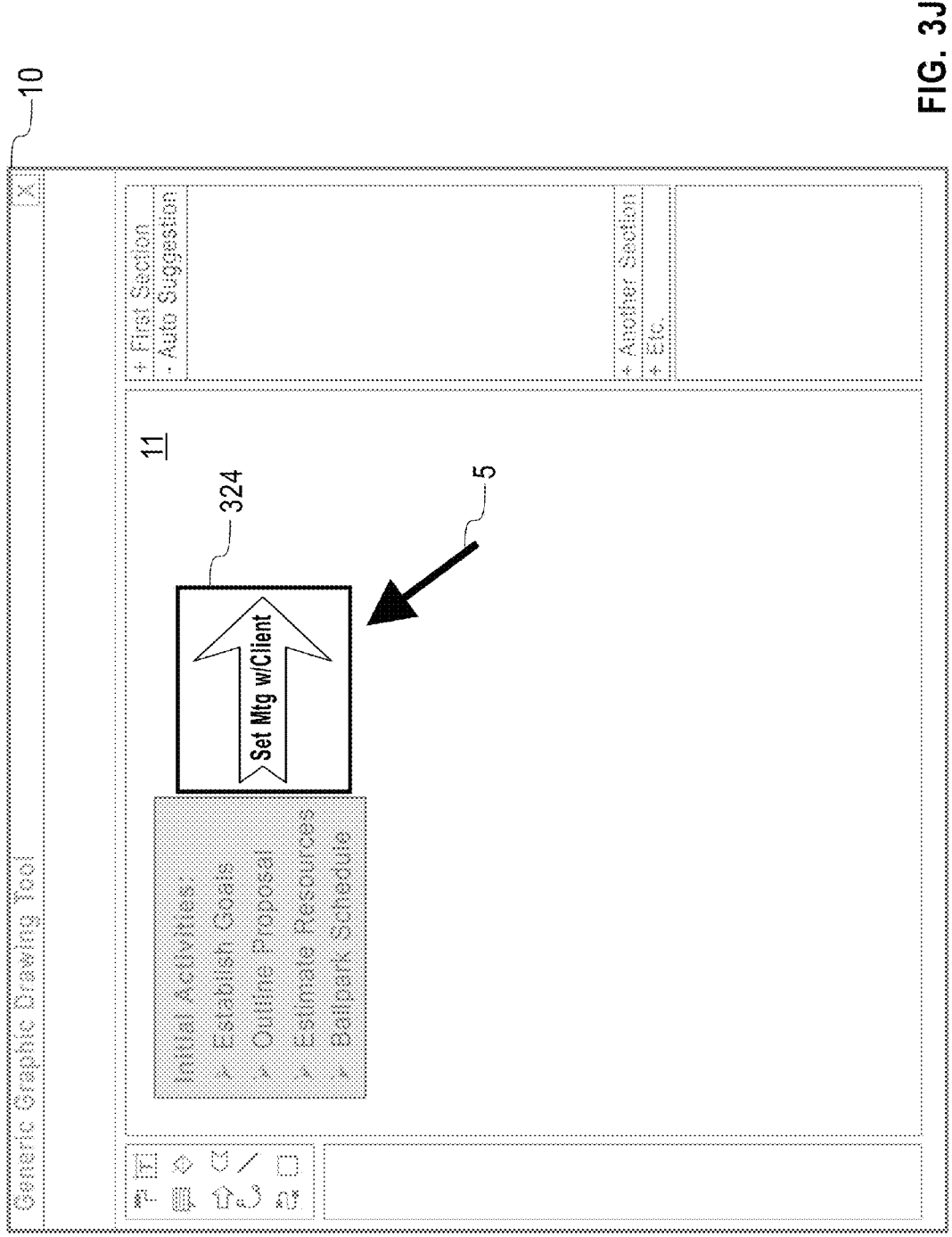
Figure 4A:
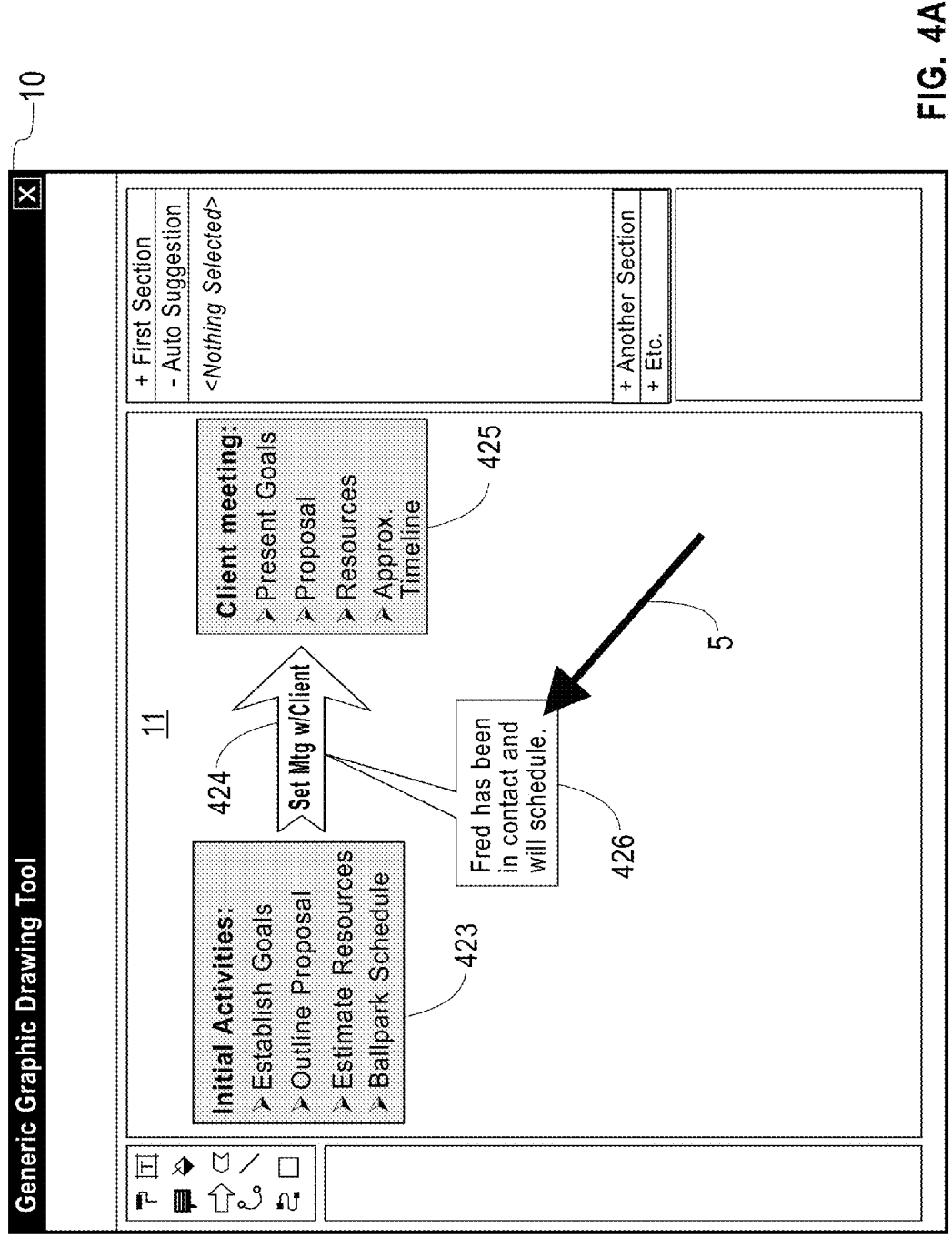
FIGS. 4A-4H illustrate another exemplary implementation according to an embodiment of the present invention.
Figure 4B:
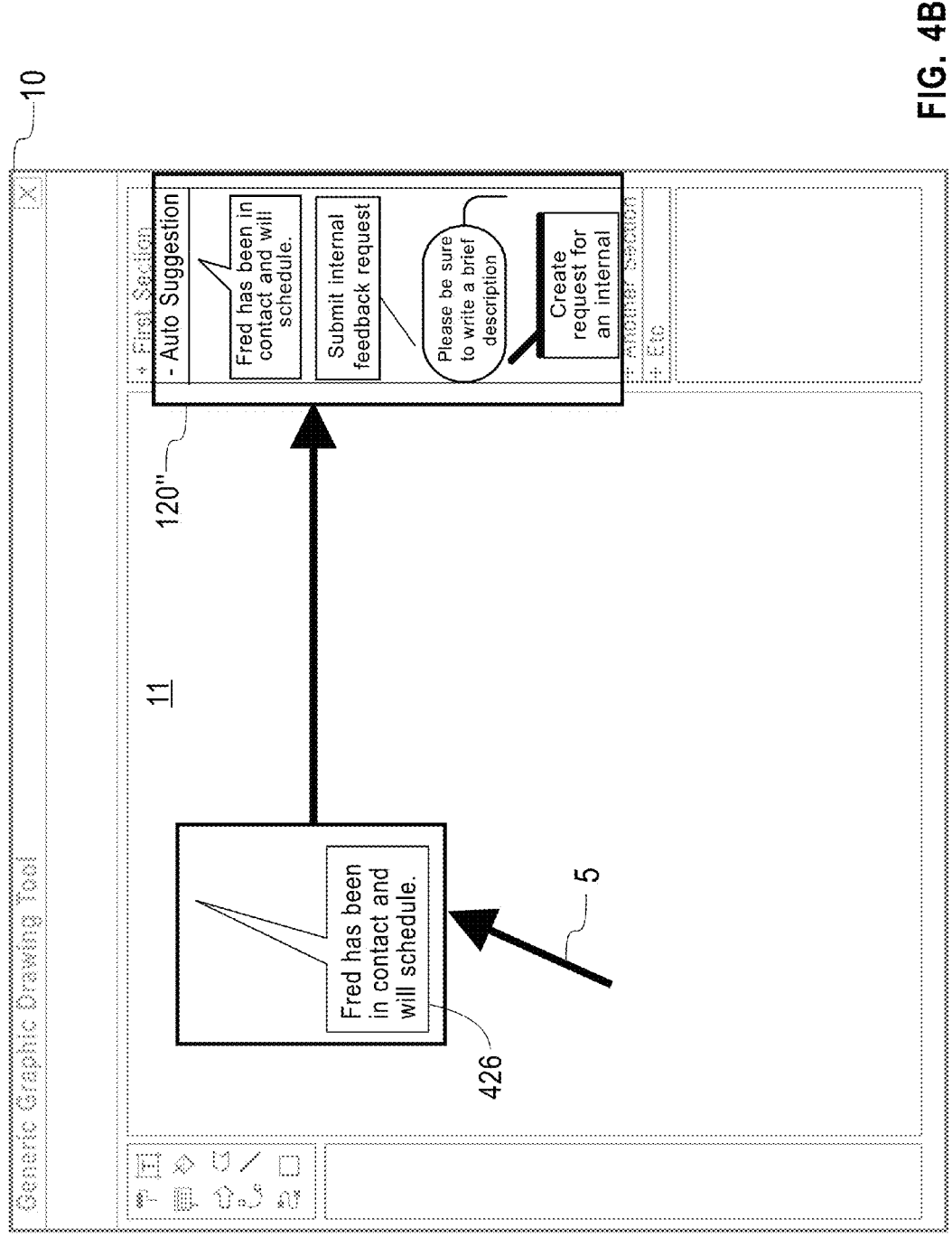
Figure 4C:
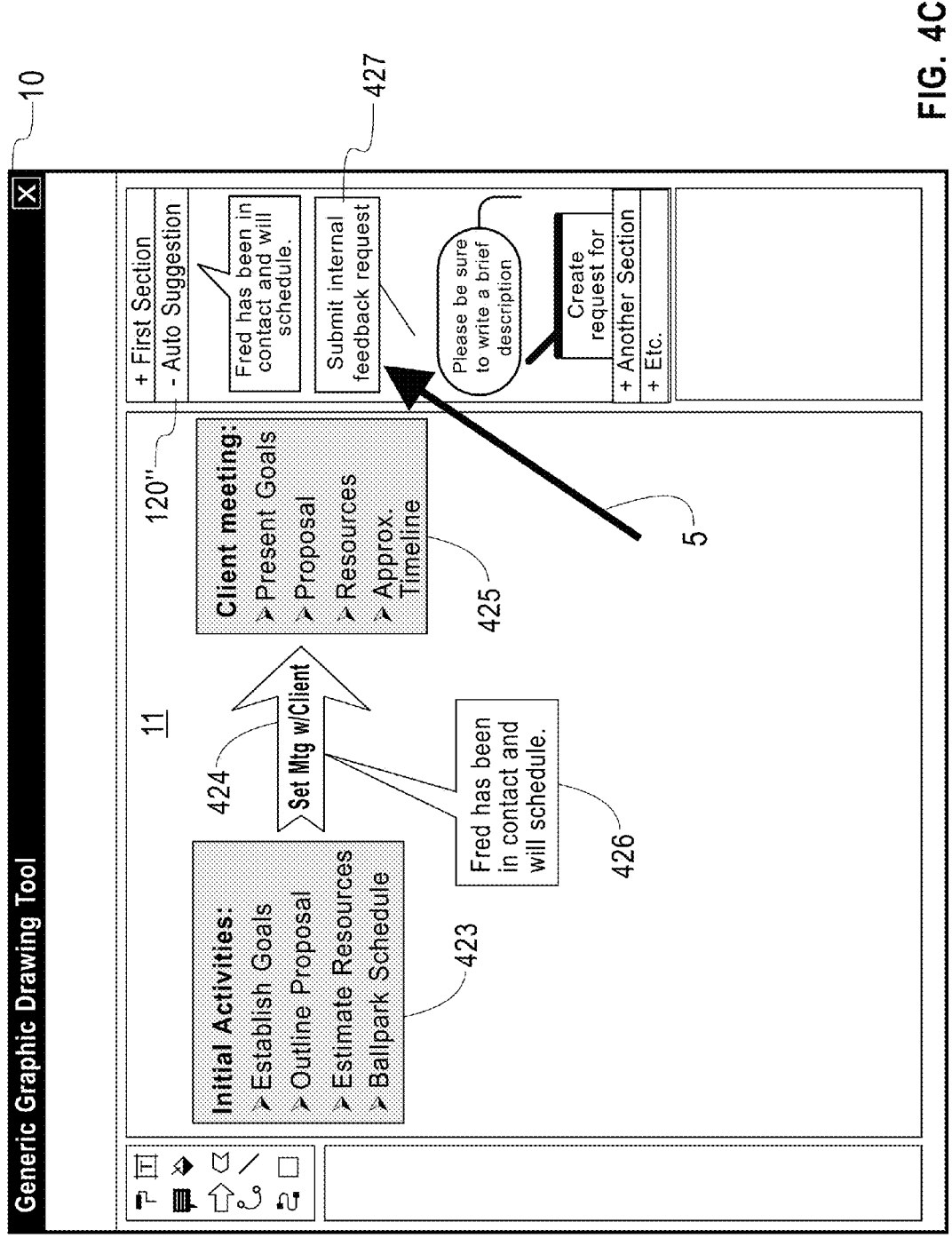
Figure 4D:
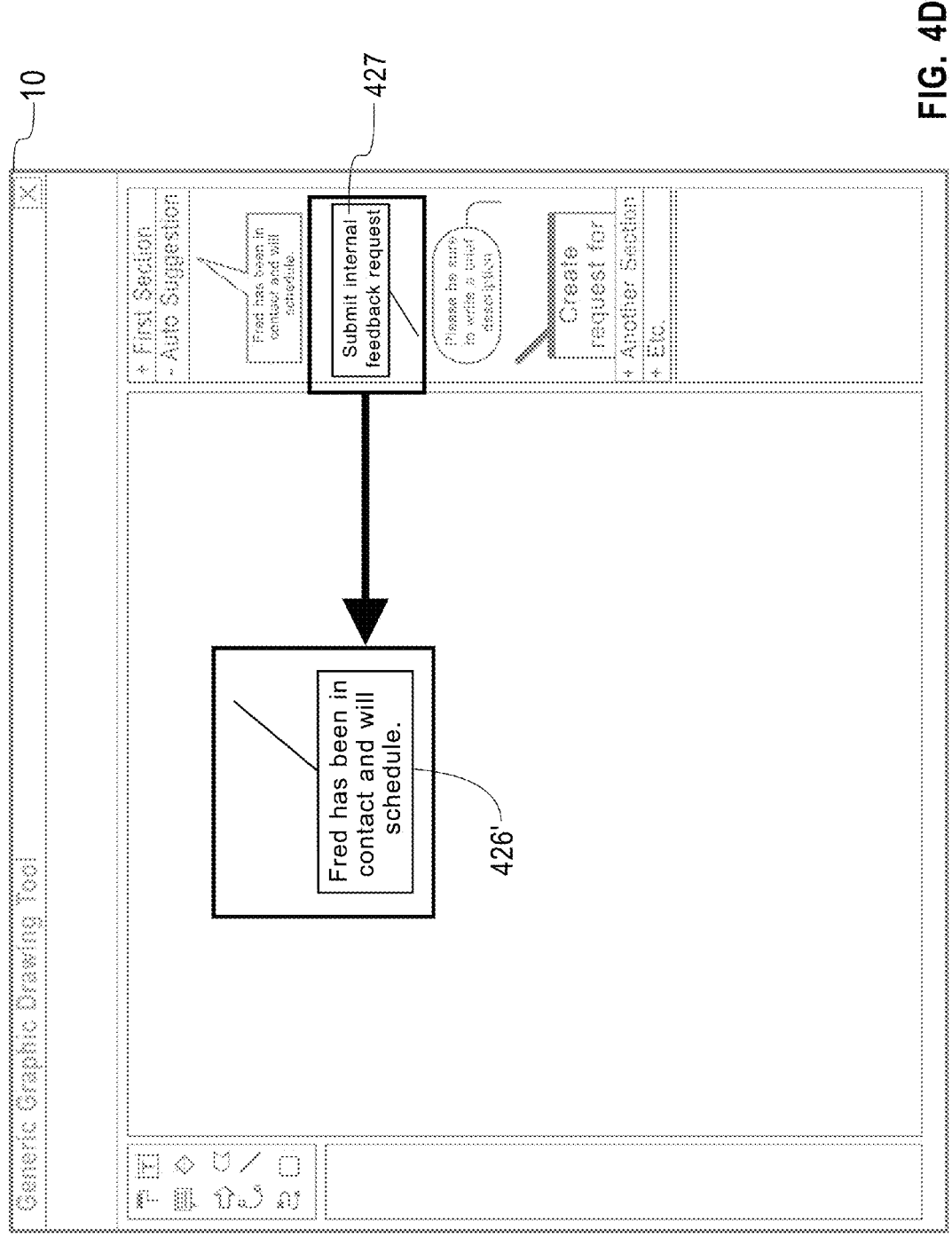
Figure 4E:
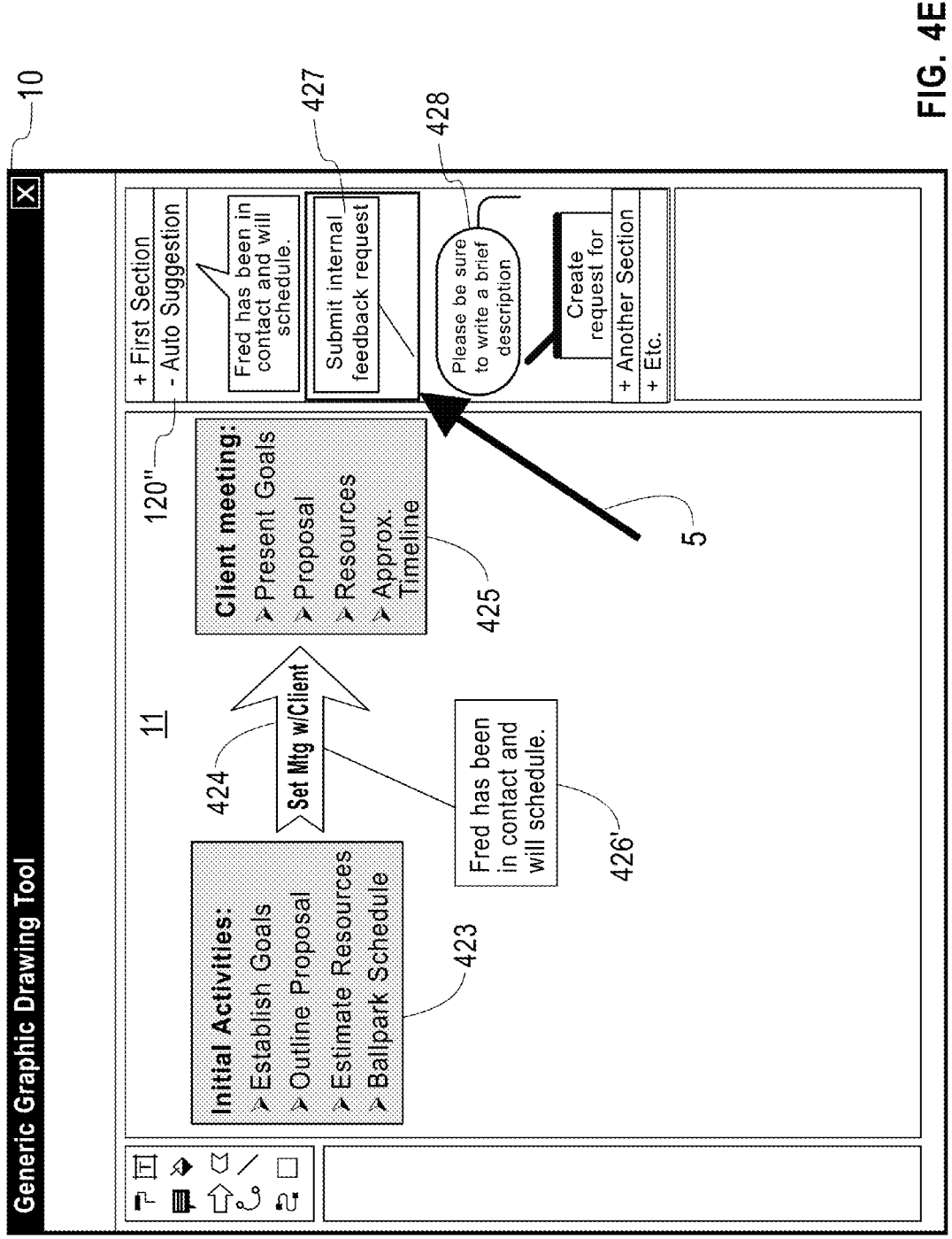
Figure 4F:
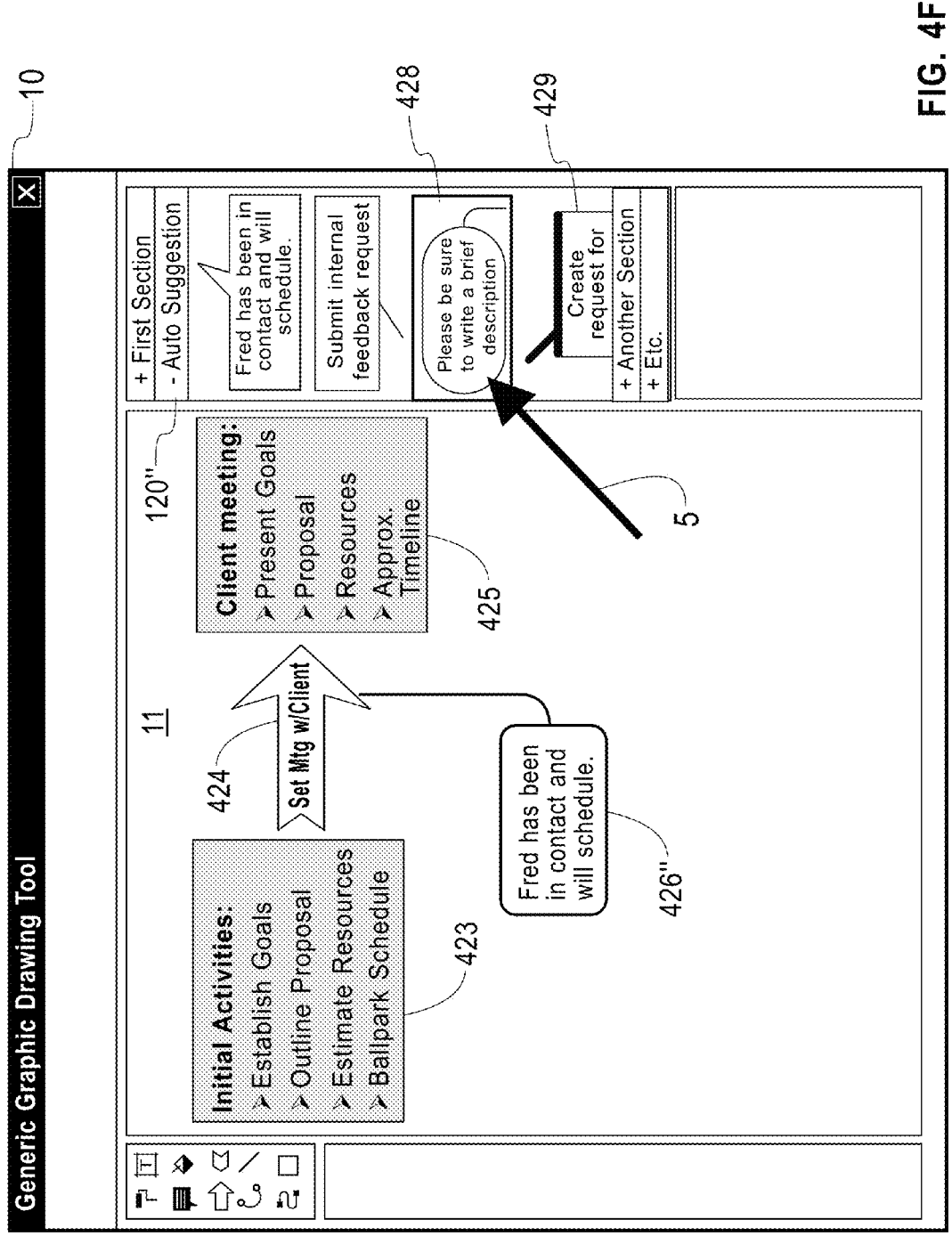
Figure 4G:
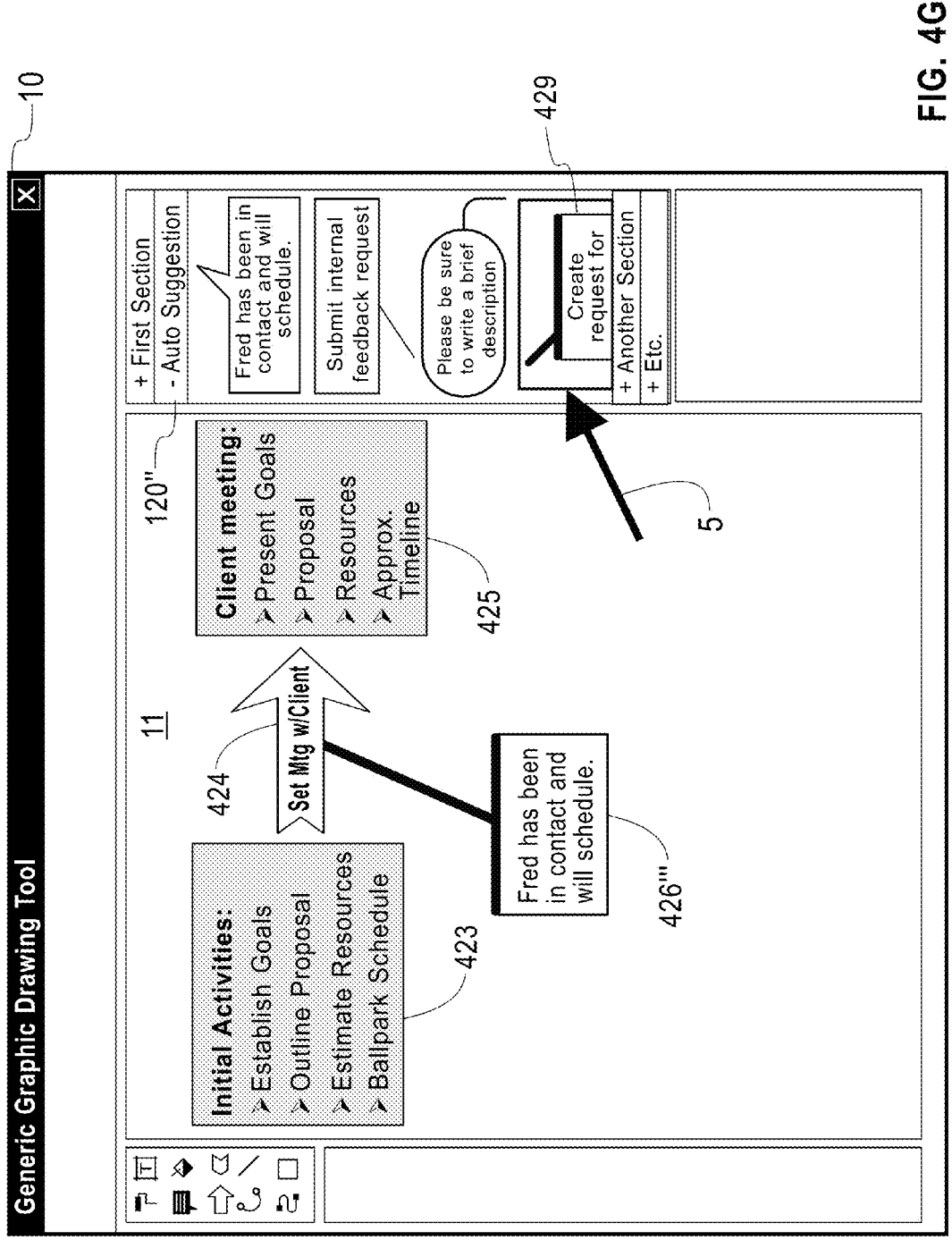
Figure 4H:
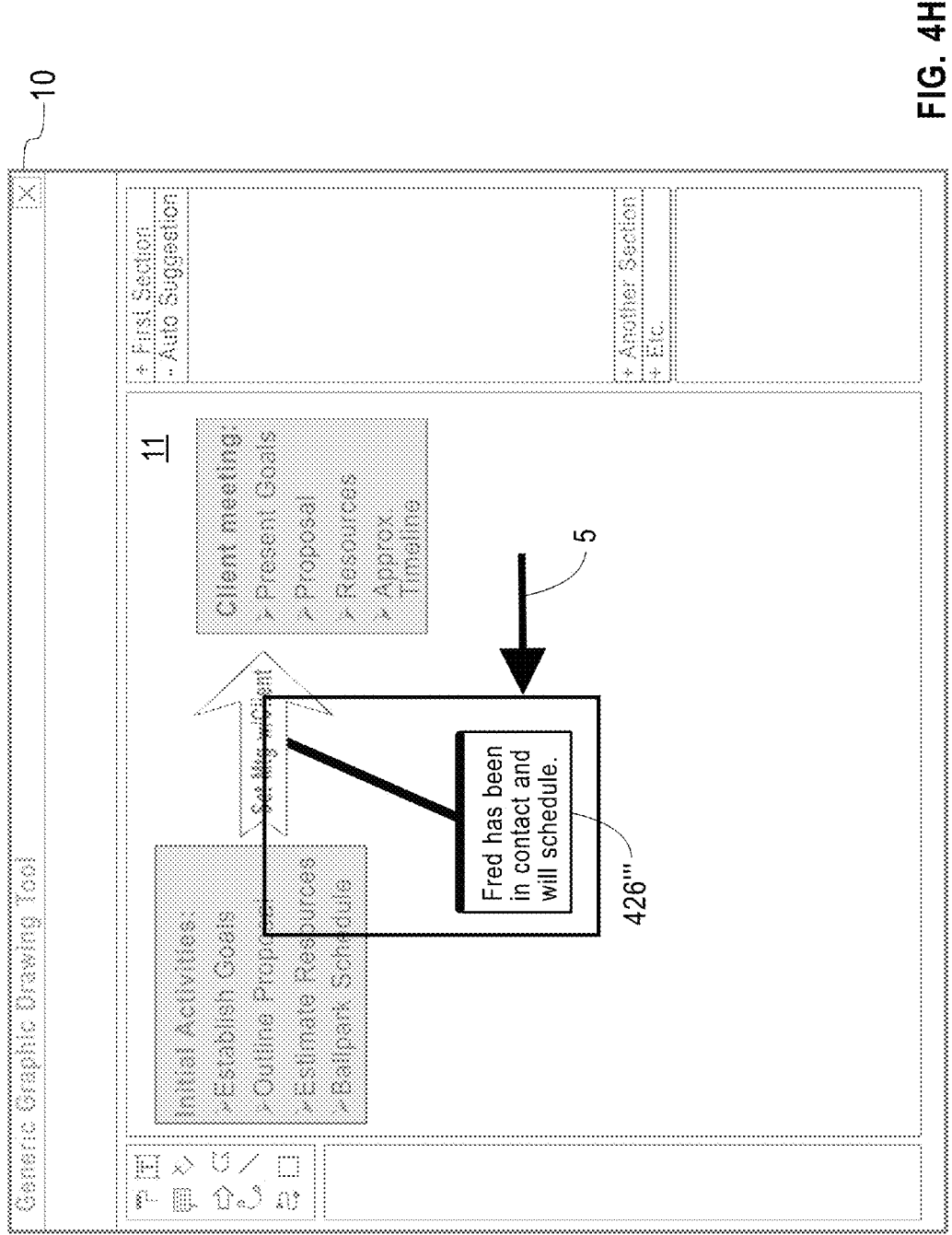

Referring to FIGS. 3F-3J, the user 5 now selects an arrow tool 303 from the tool palette area 300. Once the arrow tool 303 is selected, the auto suggestion field 120' is populated with objects of the same type, see FIG. 3G. The objects vary in style but all are arrows that a user 5 has previously used. Referring to FIGS. 3H-3I, the user 5 decided to select arrow object 324 and moves it to work space 11. Once the object 324 is moved to the work space 11, the user 5 may then further modify the object 324', see FIG. 3J.

The invention can also be understood with reference to another example. Referring to FIGS. 4A-4H, a graphic drawing application 10 is presented having a work space 11. The work space 11 is populated with a first text box object 423, an arrow object 424 and a second text box object 425. The work space 11 is further populated with a callout object 426. As with the first example according to an embodiment of the invention, the current embodiment also has an auto suggestion area. The auto suggestion area 120" is populated with objects once an object is selected from the work space 11. In the current embodiment, the callout object 426 is selected. Once the callout object 426 is selected, the auto suggestion area 120" is populated with other callout objects. The auto suggestion field 120" is populated with objects according to a ranking order and are placed in a N position according to algorithm. The ranking order is based upon recent use and frequency. A top object would be the most recently used version of this object and is placed in a $n_1$ position. Succeeding objects are positioned based on a ranking from highest to lowest according to its value using the following:

$(N-PZ)+CF$

Still referring to FIG. 4C-4H, call out object 427 is selected from the auto suggested field 120" by the user 5. The call out object 426' now takes on the style design of object 427. The user 5 has the ability to select other call out objects (428 or 429) resulting in further style changes to object 426, (426" or 426''', respectively. Again, the user 5 saves time in designing the work space item 11 by using auto-suggestion.

Figure 5:
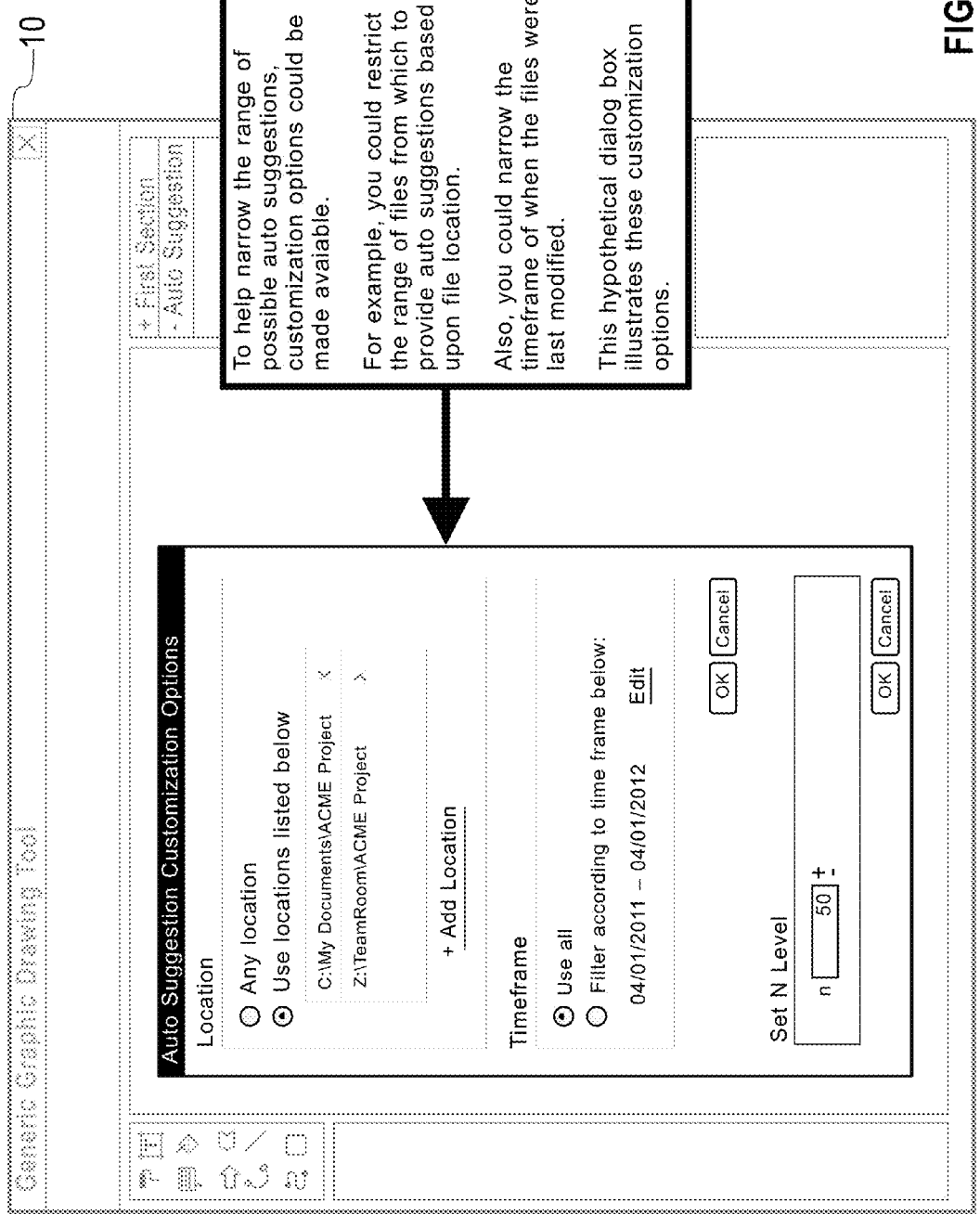
FIG. 5 shows a manual user interface according to an embodiment of the present invention.

Referring to FIG. 5, the auto suggestion field 120 includes a means for allowing a user 5 to control some aspects of the auto suggestion population. The window 500 shows possible customization options to help narrow the range of possible auto suggestions. For example, the user 5 may restrict the range of files from which to provide auto suggestions based upon file location, or timeframe. In addition, the user 5 may adjust the N number for the auto suggestion.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Referring now to FIGS. 6 and 7, this schematic drawing illustrates a hardware configuration of an information handling/computer system in accordance with the embodiments of the invention. The system comprises at least one processor or central processing unit (CPU) 611. The CPUs 611 are interconnected via system bus 612 to various devices such as a random access memory (RAM) 614, read-only memory (ROM) 616, and an input/output (I/O) adapter 618. The I/O adapter 618 can connect to peripheral devices, such as disk units 621 and tape drives 640, or other program storage devices 700 that are readable by the system. The system can read the inventive instructions on the program storage devices and follow these instructions to execute the methodology of the embodiments of the invention. The system further includes a user interface adapter 622 that connects a keyboard 624, mouse 626, speaker 628, microphone 632, and/or other user interface devices such as a touch screen device (not shown) to the bus 612 to gather user input. Additionally, a communication adapter 634 connects the bus 612 to a data processing network 625, and a display adapter 636 connects the bus 612 to a display device 628 which may be embodied as an output device such as a monitor, printer, or transmitter, for example.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method comprising:
    a computer populating an auto suggestion field with objects of the same type based upon the type of object selected in a main area of an application, the computer setting a N level for said auto suggestion field,
    the computer placing a recently used object in a first position of said N level of said auto suggestion field, and
    the computer placing succeeding objects in other positions of said N level in said auto suggestion field, wherein said succeeding objects are placed based upon a ranking order, wherein said ranking order for said succeeding objects is based upon a previous ranking order value (PZ) and a cumulative frequency value (CF) associated with each of said objects and said ranking order for said succeeding objects is based upon a (N−PZ)+CF value associated with each of said objects.

2. The method according to claim 1, wherein said auto suggestion field is part of a graphic drawing application.

3. The method according to claim 1, wherein said objects have different styles.

4. The method according to claim 1, wherein said objects within said auto suggestion field changes depending on what tool is selected from a tool palette within said graphic drawing application.

5. A computer system comprising:
    one or more processors, one or more computer-readable memories and one or more computer-readable, tangible storage devices;
    an auto suggestion field, operatively coupled to at least one of the one or more storage devices for execution by at least one of the one or more processors via at least one of the one or more memories, configured to be populated with objects of the same type and same context, said auto suggestion field is provided with N levels for placing the objects, wherein a recently used object is placed in a first position of said N levels in said auto suggestion field and succeeding objects are placed in other positions of said N levels in said auto suggestion field based upon a ranking order and the population of said auto suggestion field is executed by at least one processor, wherein said ranking order for said succeeding objects is based upon a previous ranking order value (PZ) and a cumulative frequency value (CF) associated with each of said objects and said ranking order for said succeeding objects is based upon a (N−PZ)+CF value associated with each of said objects.

6. A computer program product comprising:

one or more computer-readable, tangible storage medium;

program instructions, stored on at least one of the one or more storage medium, to populate an auto suggestion field with objects of the same type and same context, program instructions, stored on at least one of the one or more storage medium, to set a N level for said auto suggestion field, program instructions, stored on at least one of the one or more storage medium, to place a recently used object in a first position of said N level of said auto suggestion field, and program instructions, stored on at least one of the one or more storage medium, to place succeeding objects in other positions of said N level in said auto suggestion field, wherein said succeeding objects are placed based upon a ranking order, wherein said ranking order for said succeeding objects is based upon a previous ranking order value (PZ) and a cumulative frequency value (CF) associated with each of said objects and said ranking order for said succeeding objects is based upon a (N−PZ)+CF value associated with each of said objects.

7. The computer program product according to claim 6, wherein said auto suggestion field is part of a graphic drawing application.

8. The computer program product according to claim 7, wherein said objects within said auto suggestion field changes depending on what tool is selected from a tool palette within said graphic drawing application.

\* \* \* \* \*